(12) United States Patent
Tsuihiji et al.

(10) Patent No.: US 8,855,465 B2
(45) Date of Patent: Oct. 7, 2014

(54) MOVING IMAGE RECORDING APPARATUS, MOVING IMAGE RECORDING METHOD, AND PROGRAM

(75) Inventors: Yuki Tsuihiji, Kawasaki (JP); Yousuke Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/348,526

(22) Filed: Jan. 11, 2012

(65) Prior Publication Data
US 2012/0183272 A1   Jul. 19, 2012

(30) Foreign Application Priority Data

Jan. 14, 2011   (JP) .................................. 2011-006297

(51) Int. Cl.
- H04N 9/80    (2006.01)
- H04N 5/77    (2006.01)
- H04N 5/92    (2006.01)
- H04N 5/232   (2006.01)

(52) U.S. Cl.
CPC ............. *H04N 5/23293* (2013.01); *H04N 5/77* (2013.01)
USPC ............ 386/239; 386/224; 386/248; 386/326

(58) Field of Classification Search
USPC .................. 386/223–224, 239–248, 326–342
See application file for complete search history.

(56) References Cited

U.S. PATENT DOCUMENTS

| | | | |
|---|---|---|---|
| 6,675,276 B2 * | 1/2004 | Schulze et al. | 711/200 |
| 2002/0186961 A1 * | 12/2002 | Kikuchi et al. | 386/98 |
| 2005/0019012 A1 * | 1/2005 | Furuta | 386/83 |
| 2005/0276569 A1 * | 12/2005 | Na | 386/46 |
| 2008/0250030 A1 * | 10/2008 | Itoh | 707/100 |

FOREIGN PATENT DOCUMENTS

| | | |
|---|---|---|
| JP | 2004-228826 A | 8/2004 |
| JP | 2010-020576 A | 1/2010 |

* cited by examiner

*Primary Examiner* — Hung Dang
(74) *Attorney, Agent, or Firm* — Canon U.S.A., Inc. IP Division

(57) ABSTRACT

A moving image recording apparatus includes: a reading unit configured to read at least part of a file allocation table (FAT) from a recording medium, which is attached to an attachment unit and whose files are managed by a FAT file system, onto a storage unit; a recording medium determination unit configured to determine whether the recording medium attached to the attachment unit is a write-once recording medium; a moving image recordable time calculation unit configured to calculate, if the recording medium determination unit determines that the recording medium is a write-once recording medium, moving image recordable time based on the number of free clusters in the FAT read onto the storage unit by the reading unit; and a moving image recordable time display unit configured to display the moving image recordable time calculated by the moving image recordable time calculation unit on a display unit.

8 Claims, 9 Drawing Sheets

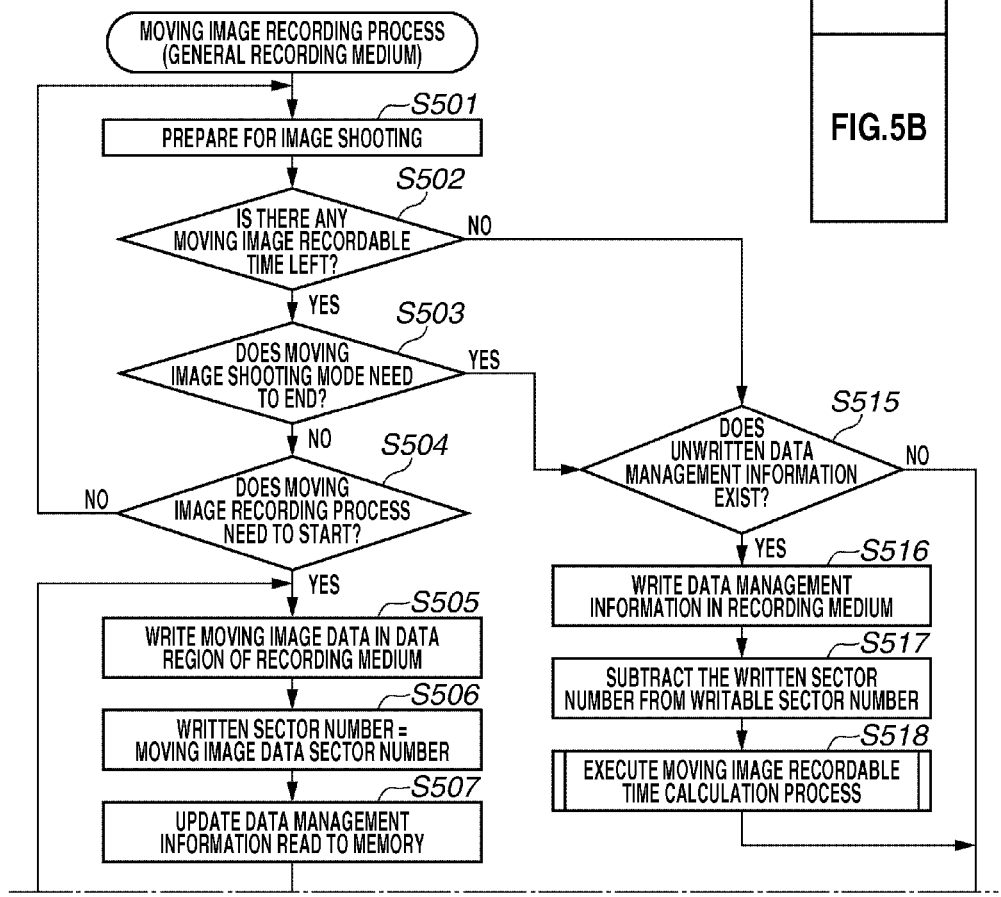

FIG.8A
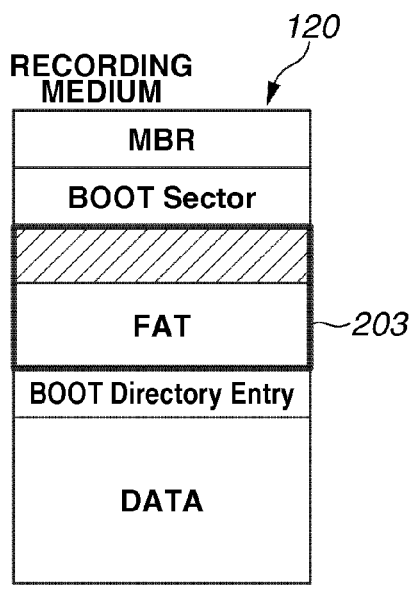
FIG.8B
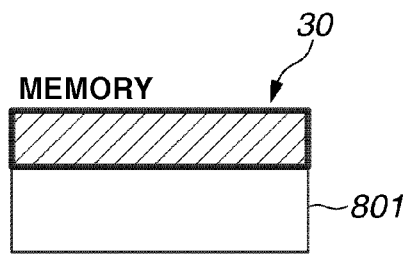
FIG.8C
| CLUSTER NUMBER | 02 | 03 | 04 | 05 | 06 | 07 | 08 | 09 | 10 |
|---|---|---|---|---|---|---|---|---|---|
| FAT | FF | FF | 00 | 00 | 00 | 00 | 00 | 00 | 00 |
801
802
FIG.8D
803
| CLUSTER NUMBER | 02 | 03 | 04 | 05 | 06 | 07 | 08 | 09 | 10 |
|---|---|---|---|---|---|---|---|---|---|
| FAT | FF | FF | 05 | 06 | 07 | 08 | 09 | 10 | EOF |

MOVING IMAGE RECORDING APPARATUS, MOVING IMAGE RECORDING METHOD, AND PROGRAM

BACKGROUND OF THE INVENTION

1. Field of the Invention

The present invention relates to a moving image recording apparatus, a moving image recording method, and a program. In particular, it relates to recording of moving image data in a write-once recording medium whose files are managed by a file allocation table (FAT) file system.

2. Description of the Related Art

Conventionally, a FAT file system is used to manage files in small electronic devices such as digital cameras. In the initial region of the FAT file system, a management region is set. The management region includes data management information, such as a master boot record, a boot sector, a FAT, and root directory entries. A data region is set after the management region. In the management region, basic information about the FAT file system is written, such as a data region size and a cluster size representing a logical minimum recording unit of the storage device. In the data region, data is stored.

Examples of such recording medium (which may be simply referred to as "medium," as needed) using the FAT file system include a general medium in which data is rewritable and a write-once medium in which data can be written only once. Generally, when moving image data is recorded in a medium using the FAT file system, the FAT once written in the medium is modified, and next, data is additionally recorded. However, when moving image data is recorded in a write-once medium, since rewriting is not possible, moving image data cannot be recorded by conventional methods.

According to a recording control device discussed in Japanese Patent Application Laid-Open No. 2010-020576, when moving image data is recorded in a write-once medium, a file is created in several batches. More specifically, 1 cluster is added to 3 clusters used as a writing unit to secure 4 clusters (clusters 4 to 7), and read moving image data of 3 clusters are sequentially allocated to the secured clusters 4 to 6. No data is recorded in the last cluster. If other moving image data needs to be recorded, a process similar to the first process is repeated to continue recording.

When recording the moving image data in a medium, users may wish to know time in which the moving image data is recordable. However, the recording control device discussed in Japanese Patent Application Laid-Open No. 2010-020576 does not include a configuration to calculate the moving image recordable time. Thus, the users cannot recognize the moving image recordable time. In addition, the recording control device discussed in Japanese Patent Application Laid-Open No. 2010-020576 repeats a process of recording and writing the secured FAT in a medium a number of times. Thus, it is difficult to increase the recording speed of moving image data. If a process of calculating the moving image recordable time is added to the recording control device discussed in Japanese Patent Application Laid-Open No. 2010-020576, processing load will be increased further.

In addition, a moving image recording time calculation device discussed in Japanese Patent Application Laid-Open No. 2004-228826 only displays the remaining capacity of a medium. The device does not calculate the moving image recordable time when a write-once medium is attached. Namely, when the device records moving image data in a write-once medium, there are cases where the moving image recordable time calculated based on the FAT read out to a memory is shorter than the moving image recordable time calculated based on free space of the medium. Thus, in the moving image recording time calculation device discussed in Japanese Patent Application Laid-Open No. 2004-228826, users cannot recognize that the moving image recordable time is actually shorter when recording moving image data in a write-once medium.

SUMMARY OF THE INVENTION

The present invention is directed to solving at least one of the above problems.

According to an aspect of the present invention, a moving image recording apparatus is provided. The apparatus includes: a reading unit configured to read at least part of a file allocation table (FAT) region from a recording medium whose files are managed by a FAT file system, onto a storage unit; a recording medium determination unit configured to determine whether a recording medium attached to an attachment unit is a write-once recording medium; a moving image recordable time calculation unit configured to calculate, if the recording medium determination unit determines that the recording medium is a write-once recording medium, moving image recordable time based on the number of free clusters in the FAT read onto the storage unit by the reading unit; and a moving image recordable time display unit configured to display the moving image recordable time calculated by the moving image recordable time calculation unit on a display unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 8A to 8D illustrate a FAT read out to a memory.

DESCRIPTION OF THE EMBODIMENTS

Various exemplary embodiments, features, and aspects of the invention will be described in detail below with reference to the drawings.

Figure 1:
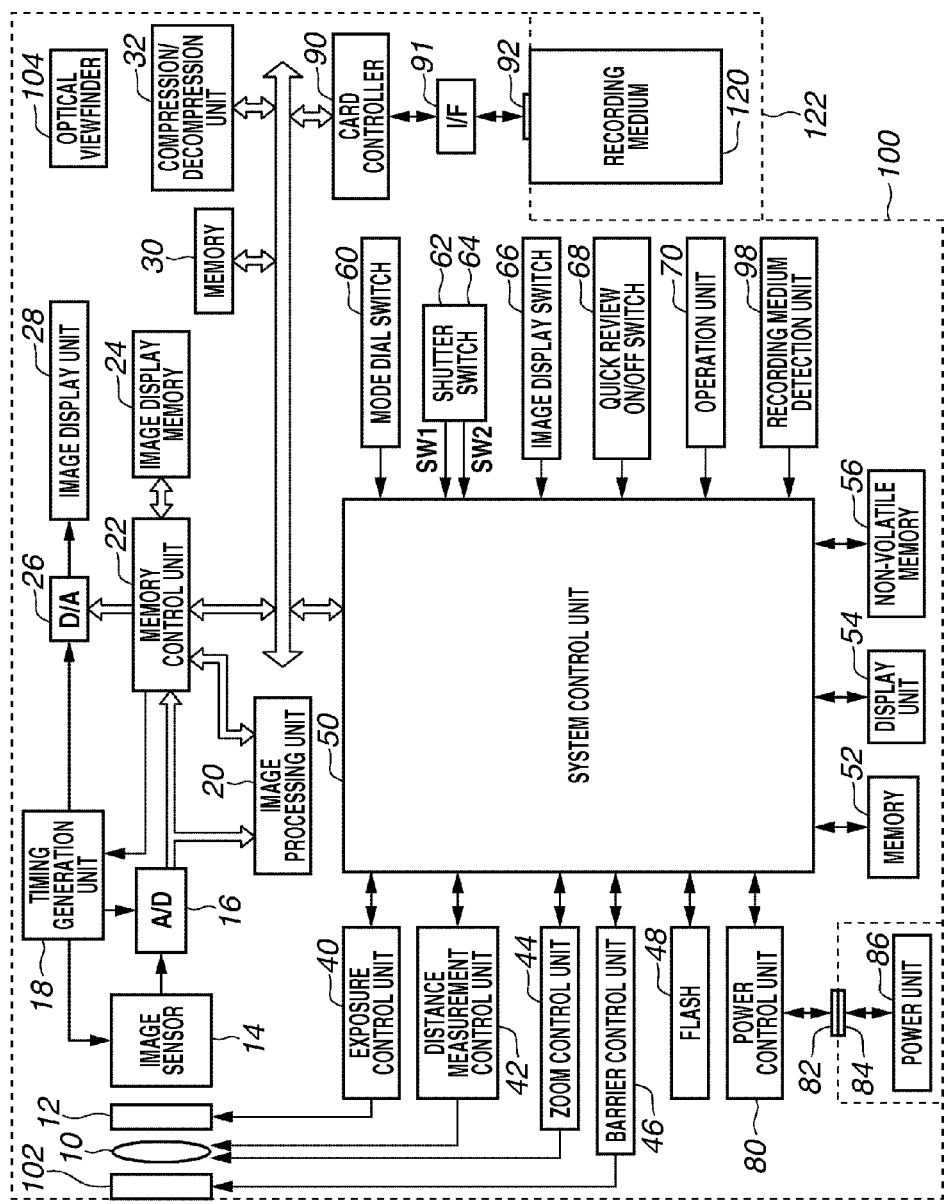
FIG. 1 illustrates a configuration of a digital camera.

An exemplary embodiment of the present invention will be described with reference to the drawings. In the present exemplary embodiment, a moving image recording apparatus will be described by using a digital camera as an example. FIG. 1 illustrates a configuration of a digital camera 100 (hereinafter, simply referred to as a camera 100). The camera 100 includes: an imaging lens 10; a shutter 12 having an aperture function;

an image sensor 14 converting an optical image into an electrical signal; and an analog/digital (A/D) converter 16 converting an analog signal from the image sensor 14 into a digital signal.

In addition, the camera 100 includes a timing generation unit 18 supplying clock and control signals to the image sensor 14, the A/D converter 16, and a digital/analog (D/A) converter 26. The timing generation unit 18 is controlled by a memory control unit 22 and a system control unit 50. In addition, the camera 100 includes an image processing unit 20 executing predetermined pixel interpolation processing or color conversion processing on data from the A/D converter 16 or the memory control unit 22. The image processing unit 20 also executes predetermined calculation processing on captured image data. Based on calculation results from the image processing unit 20, the system control unit 50 controls an exposure control unit 40 and a distance measurement control unit 42, to execute through-the-lens (TTL) automatic focus (AF) processing, automatic exposure (AE) processing, and electronic flash preliminary emission (EF) processing. In addition, the image processing unit 20 executes predetermined calculation processing on captured image data and TTL auto white balance (AWB) processing based on the obtained calculation results.

The memory control unit 22 controls the A/D converter 16, the timing generation unit 18, the image processing unit 20, an image display memory 24, the D/A converter 26, a memory 30, and a compression/decompression unit 32. Image data output from the A/D converter 16 is written in the image display memory 24 or the memory 30 via both the image processing unit 20 and the memory control unit 22 or via only the memory control unit 22.

In addition, the camera 100 includes an image display unit 28 including a thin film transistor liquid crystal display (TFT_LCD). The image display unit 28 receives display image data written in the image display memory 24 via the D/A converter 26 and displays the image data. The camera 100 can realize an electronic viewfinder function by using the image display unit 28 and sequentially displaying captured image data. The display on the image display unit 28 can be turned on/off arbitrarily based on instructions from the system control unit 50. If the display on the image display unit 28 is turned off, power consumption of the camera 100 can be reduced significantly.

The memory 30 functions as a storage unit storing captured still images or moving images. For example, the memory 30 may be a random access memory (RAM) having a sufficient capacity for storing a predetermined number of still images or storing a moving image for a predetermined time period. Thus, even when users execute continuous shooting where a number of still images are captured continuously or panoramic shooting, a large amount of image data can be written in the memory 30 at high speed. In addition, the memory 30 can function as a work area of the system control unit 50.

The compression/decompression unit 32 compresses/decompresses image data by adaptive discrete cosine transform (ADCT), for example. More specifically, the compression/decompression unit 32 reads an image stored in the memory 30, executes compression or decompression processing on the read image, and writes the processed data in the memory 30. The exposure control unit 40 controls the shutter 12 having an aperture function and operates with a flash 48 to realize a flash light amount control function.

The distance measurement control unit 42 controls focusing of the imaging lens 10. In addition, the camera 100 includes: a zoom control unit 44 controlling zooming of the imaging lens 10; and a barrier control unit 46 controlling the operation of a protection unit 102 used as a barrier. The flash 48 has an AF auxiliary light projection function and a flash light amount control function.

The exposure control unit 40 and the distance measurement control unit 42 are controlled by the TTL system. More specifically, the image processing unit 20 executes calculation processing on captured image data, and based on the calculation results, the system control unit 50 controls the exposure control unit 40 and the distance measurement control unit 42. The system control unit 50 controls the entire camera 100. A memory 52 stores constants, variables, programs, and the like used for various operations of the system control unit 50.

In addition, the camera 100 includes a display unit 54 including a liquid crystal display and a speaker. The display unit 54 uses text, image, or sound to notify users of various operation states or messages when the system control unit 50 executes a program. At least one display unit 54 is arranged near operation units of the camera 100, so that the display unit 54 is easily visible to users. The display unit 54 can be formed by a combination of an LCD, a light-emitting diode (LED), a sound production element, and the like. In addition, some of the functions of the display unit 54 are arranged in an optical viewfinder 104. For example, the display unit 54 displays various information on the LCD or the like, examples of which include information about single/continuous shooting, the self-timer, the compression ratio, the number of recording pixels, the number of recording images, the number of images recordable, and the shutter speed.

Other examples of the information include information about the aperture value, exposure compensation, flash processing, red-eye reduction, macro photography, buzzer settings, remaining clock battery capacity, remaining battery capacity, error messages, and information represented by multiple-digit numbers. Still other examples of the information include information about the state (attachment/detachment) of a recording medium 120, a communication I/F operation, and the date/time. In addition, among the information displayed by the display unit 54, examples of the information displayed in the optical viewfinder 104 include information about focusing, camera-shake warning, flash charging, the shutter speed, the aperture value, and exposure compensation.

The camera 100 includes: an electrically erasable/recordable non-volatile memory 56, such as an electrically erasable programmable read-only memory (EEPROM); and various operation units 60, 62, 64, 66, 68, and 70 for users to input various operation instructions to the system control unit 50. Each of these operation units 60, 62, 64, 66, 68, and 70 can be formed by any one of or a combination of a switch, a dial, a touch panel, pointing through line-of-sight detection, and a speech recognition unit.

Next, each of the operation units will be described in detail. The mode dial switch 60 can be used to switch various functional modes, such as a power-off mode, an automatic shooting mode, a shooting mode, a moving image shooting mode, a panoramic shooting mode, a reproduction mode, and a multiple-screen reproduction/deletion mode. While a shutter button (not illustrated) is being operated, the shutter switch (SW1) 62 is turned on and gives instructions to start operations such as AF processing, AE processing, AWB processing, and EF processing. When an operation of the shutter button (not illustrated) is completed, the shutter switch (SW2) 64 is turned on, and a series of imaging processes is executed. In this series of imaging processes, the image sensor 14 reads an image signal, and the A/D converter 16 executes analog-to-digital conversion. In addition, the image processing unit 20 executes image processing, and the memory 30 stores the image data. In addition, the shutter switch (SW1) 62 gives instructions to the system control unit 50 to start a series of imaging processes in which the compression/decompression unit 32 reads the image data from the memory 30, compresses the image data, and writes the compressed image data in the recording medium 120.

The image display switch 66 can be used to set ON/OFF of the image display unit 28. With this function, when users shoot an image by using the optical viewfinder 104, current supply to the image display unit 28 can be blocked. As a result, power saving can be realized. The quick review ON/OFF switch 68 can be used to set a quick review function for automatically reproducing image data captured immediately after shooting. In the present exemplary embodiment, the quick review ON/OFF switch 68 can set a quick review function when the image display unit 28 is OFF.

The operation unit 70 is formed by various buttons, a touch panel, and the like. For example, the operation unit 70 includes a menu button, a set button, a macro button, a multiple-screen reproduction and page-advance button, a flash setting button, a single shooting/continuous shooting/self-timer switch button, a menu scroll + (plus) button, and a menu scroll − (minus) button. As other examples, the operation unit 70 may include a reproduced image scroll + (plus) button, a reproduced image scroll − (minus) button, an image quality selection button, an exposure compensation button, and a date/time setting button.

A power control unit 80 includes a battery detection circuit, a DC-DC converter, and a switch circuit switching current-conduction blocks. The power control unit 80 detects attachment of a battery, a battery type, and a remaining battery capacity. Based on results of the detection and instructions from the system control unit 50, the power control unit 80 controls the DC-DC converter to supply a necessary voltage to each of the various units including the recording medium 120 for a necessary period. The camera 100 also includes connectors 82 and 84 and a power unit 86. The power unit 86 includes a primary battery such as an alkaline battery or a lithium battery, a secondary battery such as a NiCd battery, a NiMH battery, or a Li battery, and an AC adapter.

In addition, the camera 100 includes: a card controller 90 receiving/transmitting data from/to the recording medium 120; an interface 91 for the recording medium 120; a connector 92 for connection with the recording medium 120; and a recording medium detection unit 98 detecting whether the recording medium 120 is attached to an attachment slot 122 and connected to the connector 92.

In the present exemplary embodiment, the camera 100 includes an interface and a connector of a single system to which the recording medium 120 is attached. However, the camera 100 may include interfaces and connectors of two or more systems. If the camera 100 includes interfaces and connectors of a plurality of systems, each of the systems may have a different specification from each other. The camera 100 can use devices complying with standards, as the interface 91 and the connector 92. For example, the camera 100 can use a Personal Computer Memory Card International Association (PCMCIA) card or a Compact Flash (CF) card (registered trademark). In this case, various types of communication cards can be connected, such as a local area network (LAN) card, a modem card, a universal serial bus (USB) card, an IEEE (The Institute of Electrical and Electronic Engineers) 1394 card, a P1284 card, a small computer system interface (SCSI) card, and a personal handy-phone system (PHS) communication card. In this way, the camera 100 can exchange image data or management information about image data with other computers or peripheral devices such as printers.

The protection unit 102 serves as a barrier covering an imaging unit including the imaging lens 10 of the camera 100. The protection unit 102 prevents contamination of or damage to the imaging unit. The optical viewfinder 104 enables shooting, without use of an electronic viewfinder function of the image display unit 28. The optical viewfinder 104 includes display elements forming part of the display unit 54 for displaying information about focusing, camera-shake warning, flash charging, the shutter speed, the aperture value, and exposure compensation. The recording medium 120 is a medium such as a memory card attached to the attachment slot 122 as an attachment unit.

The camera 100 configured as described above calculates the moving image recordable time for which moving image data is recordable in the recording medium 120 attached to the attachment slot 122 and displays the moving image recordable time on the image display unit 28. In addition, based on user instructions, the camera 100 records moving image data and continuously calculates and displays the moving image recordable time on the image display unit 28. Next, each of the processes according to the present exemplary embodiment will be described with reference to flow charts. The system control unit 50 executes programs stored in the nonvolatile memory 56 and controls the image display unit 28, the recording medium detection unit 98, and the like, to realize each of the processes in the flow charts.

Figure 3:
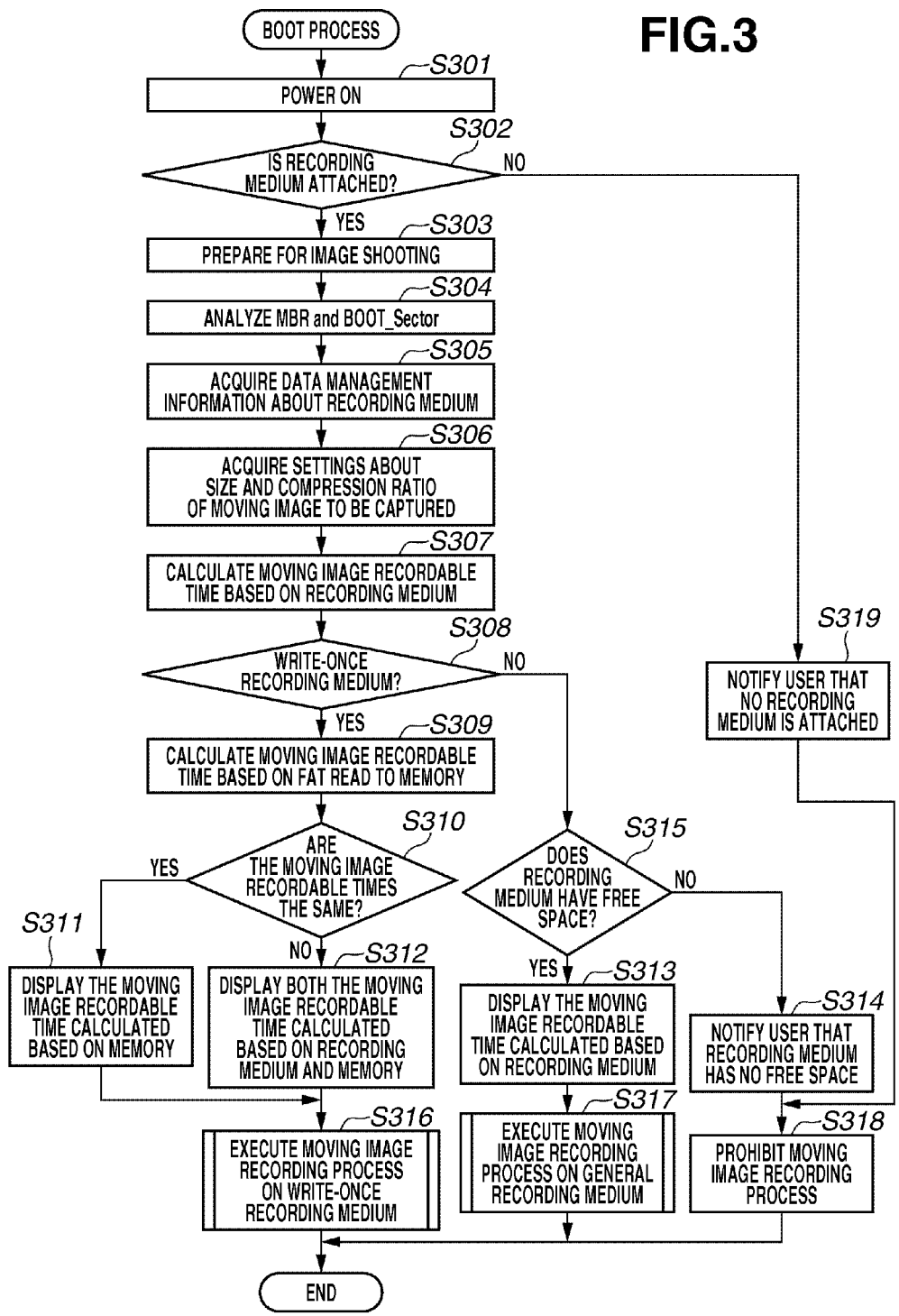
FIG. 3 is a flow chart of a boot process of the digital camera.

FIG. 3 is a flow chart illustrating a boot process of the camera 100. First, in step S301, when a user turns on the power, the system control unit 50 starts an operation. For example, when a user sets the mode dial switch 60 to a still/moving image shooting mode, a captured still/moving image reproduction mode or a moving image shooting mode, the camera 100 according to the present exemplary embodiment determines that the user has turned on the power. In step S302, the system control unit 50 uses the recording medium detection unit 98 to determine whether the recording medium 120 is attached to the attachment slot 122. If the recording medium 120 is attached (YES in step S302), the process proceeds to step S303. If not (NO in step S302), the process proceeds to step S319.

Figure 7A:
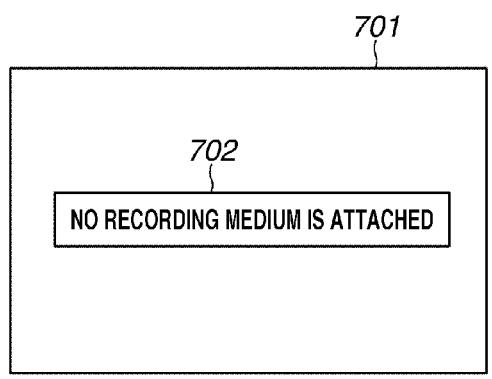
FIGS. 7A to 7D illustrate information displayed on an image display unit.

In step S319, the system control unit 50 instructs the image display unit 28 to notify the user that the recording medium 120 is not attached, and the process proceeds to step S318. In step S319, sound may be generated to notify the user of the non-attached state. FIG. 7A illustrates the image display unit 28 notifying the user that no recording medium 120 is attached. As illustrated in FIG. 7A, the system control unit 50 can instruct the image display unit 28 to display a message 702 on a screen 701 of the image display unit 28.

On the other hand (YES in step S302), in step S303, the system control unit 50 supplies power to various units including the recording medium 120. In addition, the system control unit 50 initializes hardware to prepare for image shooting. For example, the system control unit 50 uses the zoom control unit 44 to move the imaging lens 10 to a predetermined position. The operation next proceeds to step S304. In step S304, the system control unit 50 analyzes the master boot record (MBR) and BOOT_Sector of the FAT file system of the recording medium 120. Next, the process proceeds to step S305.

Figure 2:
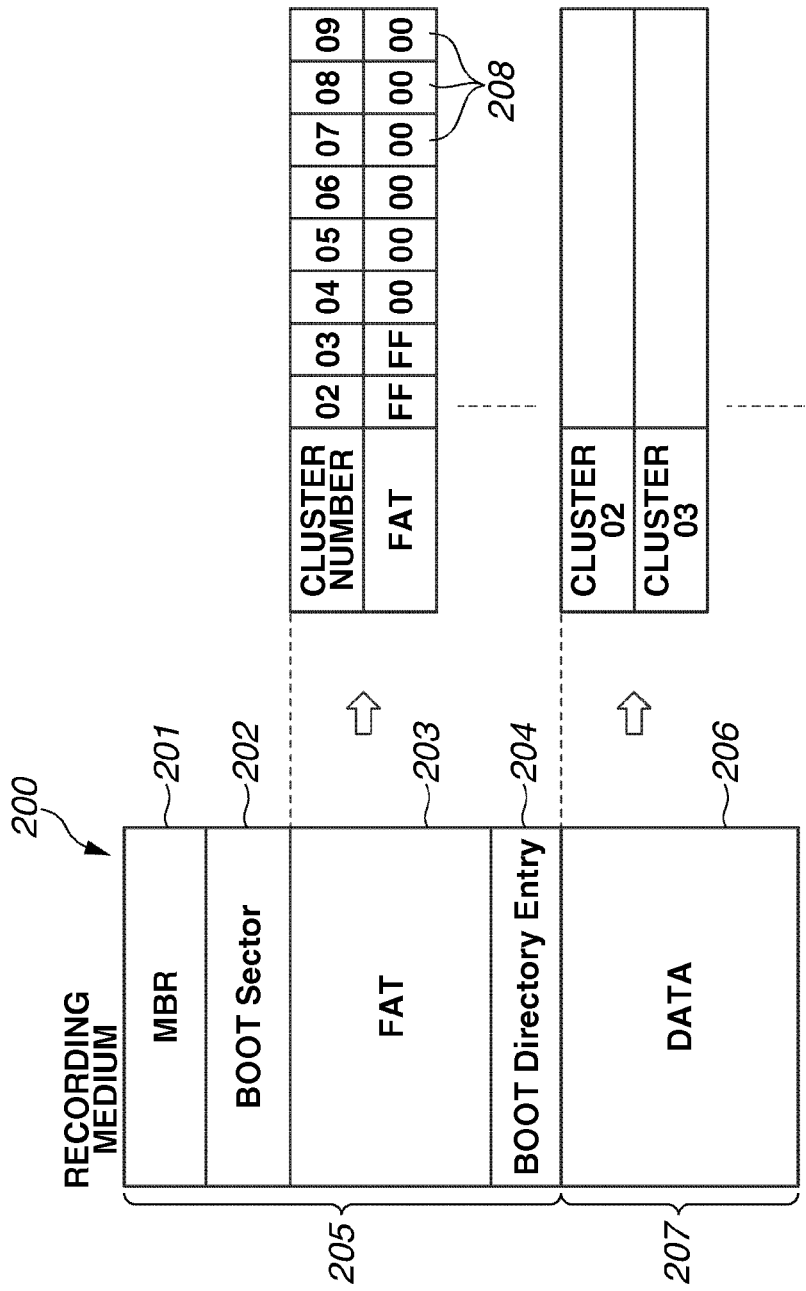
FIG. 2 illustrates a general configuration of a FAT file system.

Files of the recording medium 120 are managed by a FAT file system 200 as illustrated in FIG. 2. As illustrated in FIG. 2, in the FAT file system 200, a management region 205 including data management information such as an MBR

201, a BOOT_Sector 202, a FAT 203, and a ROOT_Directory_Entry 204 is set. In addition, after the management region 205, a data region 207 in which a DATA 206 is stored is set.

The MBR 201 stores overall information about the recording medium 120, for example. The BOOT_Sector 202 stores format types and positions and sizes of the FAT 203, for example. The ROOT_Directory_Entry 204 stores file names, created dates, attributes, sizes and head positions of the DATA 206, for example. In the FAT 203, a FAT entry 208 corresponding to each cluster number of the DATA 206 is set. In each FAT entry 208, a cluster number to be read next is stored. If FF or the next cluster number is stored in a FAT entry 208, the FAT entry 208 is a used cluster. If 00 is stored in a FAT entry 208, the FAT entry 208 is a free cluster. The DATA 206 is managed per cluster formed by a plurality of sectors, and each cluster has a cluster number.

In step S305, the system control unit 50 acquires data management information about the recording medium 120, such as a FAT size and a cluster size. Next, the process proceeds to step S306. This step corresponds to a process executed by a reading unit. Next, in step S306, the system control unit 50 acquires mode settings previously set by the user, such as a size and a compression ratio of a moving image to be captured, from the non-volatile memory 56. Next, the operation proceeds to step S307. In step S307, the system control unit 50 calculates the moving image recordable time of the recording medium 120, based on the number of free clusters in the FAT among the acquired data management information. Next, the process proceeds to step S308. This step corresponds to a process executed by a medium recordable time calculation unit. The moving image recordable time calculated by this step depends on the free space of the data region of the recording medium 120.

In step S308, the system control unit 50 determines whether the recording medium 120 attached to the attachment slot 122 is a write-once recording medium. This step corresponds to a process executed by a recording medium determination unit. The system control unit 50 makes this determination by referring to a register representing a type of the recording medium 120 described in the recording medium 120. If the recording medium 120 is a write-once recording medium (YES in step S308), the process proceeds to step S309. If not (NO in step S308), the process proceeds to step S315. In step S309, the system control unit 50 reads (rasterizes) the FAT and file directory onto the memory 30, among the acquired data management information about the recording medium 120. The system control unit 50 calculates the moving image recordable time, based on the number of free clusters in the FAT read onto the memory 30. Next, the process proceeds to step S310. This step corresponds to a process executed by a moving image recordable time calculation unit.

Next, in step S310, the system control unit 50 determines whether the moving image recordable time calculated in step 307 matches the moving image recordable time calculated in step S309. The step corresponds to a process executed by a time determination unit. If these times match (YES in step S310), the process proceeds to step S311. If not (NO in step S310), the process proceeds to step S312. In step S309, for example, if the memory 30 is being used by other processing, there are cases where the FAT region read onto the memory 30 cannot be secured sufficiently. In such a case, the number of free clusters in the FAT secured in the memory 30 is reduced. Thus, there are cases where the moving image recordable time calculated in step S310 is shorter than the moving image recordable time calculated in step S307.

Figure 7B:
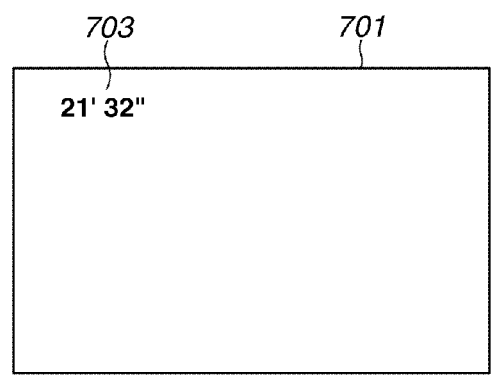

In step S311, the system control unit 50 instructs the image display unit 28 to display the moving image recordable time calculated in step S309. Next, the process proceeds to step S316. This step corresponds to a process executed by a moving image recordable time display unit. FIG. 7B illustrates a display example of the moving image recordable time displayed on the image display unit 28. As illustrated in FIG. 7B, the system control unit 50 can instruct the image display unit 28 to display a moving image recordable time 703 on the screen 701. In step S316, the system control unit 50 executes a moving image recording process on the write-once recording medium 120.

On the other hand (NO in step S310), in step S312, the system control unit 50 can instruct the image display unit 28 to display both the moving image recordable time calculated in step S307 and the moving image recordable time calculated in step S309. Next, the process proceeds to step S316. The step of displaying the moving image recordable time calculated in step S307 corresponds to a process executed by a medium recordable time display unit.

Figure 7C:
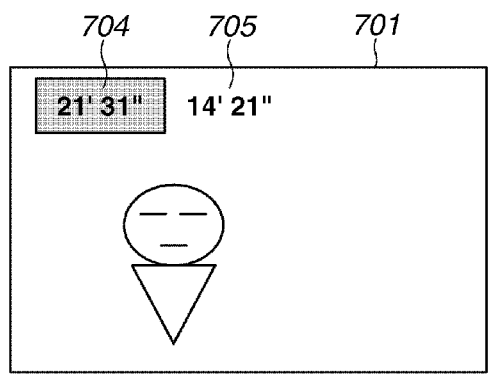

FIG. 7C illustrates both of the moving image recordable times displayed on the image display unit 28. As illustrated in FIG. 7C, the system control unit 50 can instruct the image display unit 28 to display a moving image recordable time 704 calculated in step S307 and a moving image recordable time 705 calculated in step S309 on the screen 701. In practice, the system control unit 50 cannot record moving image data for the moving image recordable time 704. Thus, while the recording medium 120 has free space for the moving image recordable time 704, the system control unit 50 notifies the user that the recording medium 120 can record the moving image data only for the moving image recordable time 705.

In FIG. 7C, the moving image recordable time 704 is displayed differently from the moving image recordable time 705 (by grayout or hatching, for example), so that the user can recognize that recording is not possible up to the moving image recordable time 704 though the recording medium 120 has free space. In place of the display in FIG. 7C, the moving image recordable time 705 calculated in step S309 may be displayed while the moving image recordable time 704 calculated in step S307 is not displayed. Further, if the rewritable moving image recording medium is used, the display may be performed as illustrated in FIG. 7B, and if the write-once recording medium 120 is used, the moving image recordable time 705 calculated in step S309 may be displayed in place of the moving image recordable time 704. However, it is useful to notify the user that only moving data of the moving image recordable time 705 is available for recording the moving data though the recording medium 120 has free space of the moving image recordable time 704 as illustrated in FIG. 7C.

In step S315, the system control unit 50 determines whether the recording medium 120 has free space. If the recording medium 120 has free space (YES in step S315), the process proceeds to step S313. If not (NO in step S315), the process proceeds to step S314. In step S313, the system control unit 50 instructs the image display unit 28 to display the moving image recordable time calculated in step S307, and the process proceeds to step S317. FIG. 7B illustrates a display example of the moving image recordable time on the image display unit 28. As illustrated in FIG. 7B, the system control unit 50 can instruct the image display unit 28 to display the moving image recordable time 703 on the screen 701.

Figure 7D:
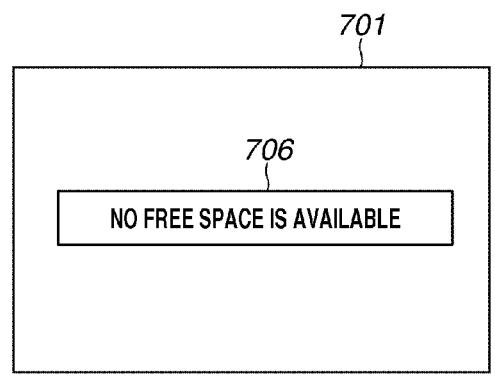

In step S317, the system control unit 50 executes a moving image recording process on a general recording medium 120, which is not a write-once recording medium. In step S314, the system control unit 50 instructs the image display unit 28 to display a message to notify the user that the recording medium 120 does not have any free space. Next, the process proceeds to step S318. FIG. 7D illustrates a display example on the image display unit 28 notifying that the recording medium 120 does not have any free space. As illustrated in FIG. 7D, the system control unit 50 can instruct the image display unit 28 to display a message 706 on the screen 701. In step S318, the system control unit 50 prohibits a moving image recording process through the shutter switch (SW1) 62 or the shutter switch (SW2) 64. Thus, the system control unit 50 ends the boot process.

Figure 4:
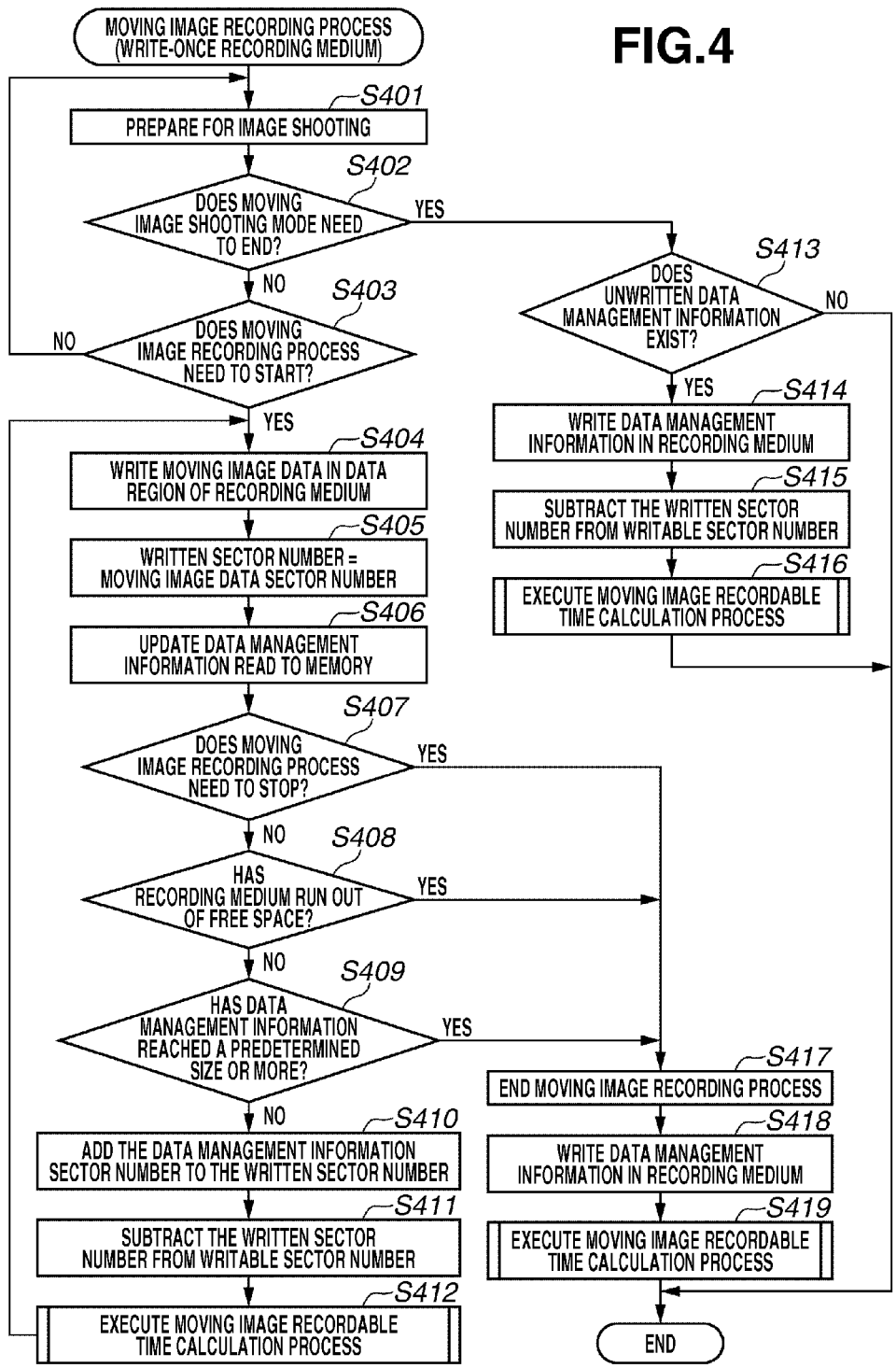
FIG. 4 is a flow chart illustrating a moving image recording process executed on a write-once recording medium.

Next, the moving image recording process in step S316 in FIG. 3 will be described with reference to a flow chart in FIG. 4. FIG. 4 is a flow chart illustrating the moving image recording process executed in the write-once recording medium 120. In step S401, when the user uses the mode dial switch 60 and sets the moving image shooting mode, the system control unit 50 starts to prepare for image shooting. Next, the process proceeds to step S402. The recordable sector number and the moving image recordable time of the recording medium 120 have already been calculated during the boot process in the flow chart in FIG. 3. In step S402, the system control unit 50 determines whether the moving image shooting mode is to end. If the moving image shooting mode is to end (YES in step S402), the process proceeds to step S413. If not (NO in step S402), the process proceeds to step S403. The system control unit 50 determines that the moving image shooting mode is to end, if the user sets the mode dial switch 60 to the reproduction mode or the like, if the user turns off the power, or if the system control unit 50 detects a system malfunction and turns off the power.

In step S403, the system control unit 50 determines whether the moving image recording process is to start. If the moving image recording process is to start (YES in step S403), the process proceeds to step S404. If not (NO in step S403), the process returns to step S401. The system control unit 50 determines that the moving image recording process is to start if the system control unit 50 detects that the user has operated the shutter switch (SW1) 62 and the shutter switch (SW2) 64. In step S404, the system control unit 50 writes moving image data in the data region of the recording medium 120. Next, the process proceeds to step S405. This step corresponds to a process executed by a moving image recording unit.

In step S405, the system control unit 50 sets the number of sectors of the recorded moving image data to the number of written sectors. Next, the process proceeds to step S406. In step S406, based on the recording medium 120 recording moving image data, the system control unit 50 updates the data management information read onto the memory 30, such as the FAT and the directory entries. Next, the process proceeds to step S407. More specifically, the system control unit 50 updates the data management information, by writing or editing the cluster numbers of the written recording medium 120 in the FAT entries in the FAT, as needed. In step S407, the system control unit 50 determines whether the moving image recording process is to stop. If the moving image recording process is to stop (YES in step S407), the process proceeds to step S417. If not (NO in step S407), the process proceeds to step S408. The system control unit 50 determines that the moving image recording process is to stop if the system control unit 50 detects that the user has operated the shutter switch (SW1) 62 and the shutter switch (SW2) 64.

In step S408, since the recording medium 120 has been storing moving image data, the system control unit 50 determines whether the recording medium 120 has run out of free space. If the recording medium 120 has run out of free space (YES in step S408), the process proceeds to step S417. If not (NO in step S408), the process proceeds to step S409. If the data region of the recording medium 120 has stored sufficient moving image data and run out of any free space, the process proceeds to step S417. In step S409, the system control unit 50 determines whether the updated data management information has reached a predetermined size or more. This step corresponds to a process executed by a cluster determination unit. If the updated data management information has reached a predetermined size or more (YES in step S409), the process proceeds to step S417. If not (NO in step S409), the process proceeds to step S410. The system control unit 50 determines that the data management information has reached a predetermined size or more, for example, if the updated FAT size has reached the FAT size or more read onto the memory 30 or if the free clusters in the FAT read onto the memory 30 have run out when cluster numbers are added to the FAT entries.

In step S410, the system control unit 50 adds the sector number in the data management information newly written by the update in step S406 to the written sector number. Next, the process proceeds to step S411. In step S411, the system control unit 50 subtracts the written sector number after the addition in step S411, from the current writable sector number. Next, the process proceeds to step S412. In step S412, the system control unit 50 executes a moving image recordable time calculation process. Next, the process returns to step S404.

On the other hand, in step S417, the system control unit 50 ends the moving image recording process. Next, the process proceeds to step S418. In step S418, the system control unit 50 writes the data management information on the memory 30, such as the FAT and directory entries, in the recording medium 120. Next, the process proceeds to step S419. This step corresponds to a process executed by a writing unit. In step S419, the system control unit 50 executes a moving image recordable time calculation process and ends the moving image recording process.

After determining that the moving image shooting mode is to end in step S402, in step S413, the system control unit 50 determines whether unwritten data management information exists. If unwritten data management information exists (YES in step S413), the process proceeds to step S414. If not (NO in step S413), the system control unit 50 ends the moving image recording process. Since steps S414 to S416 are the same as steps S418, S411, and S412, respectively, the description thereof will be omitted.

Figure 5B:
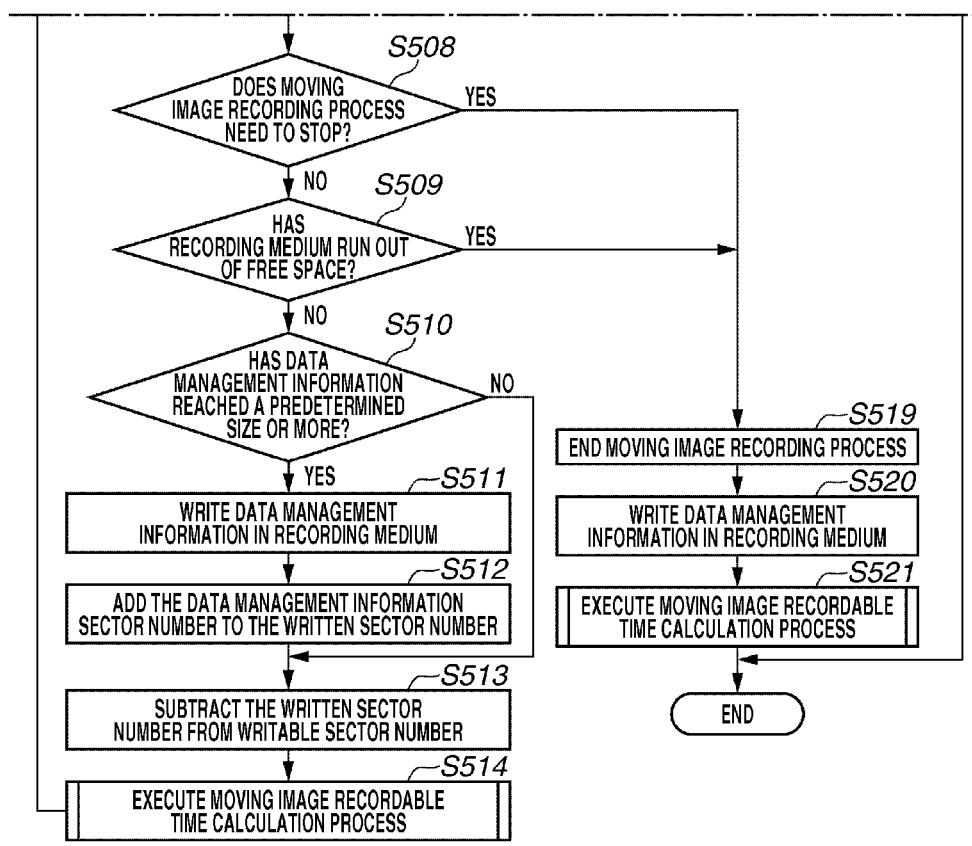
FIG. 5 is a flow chart illustrating a moving image recording process executed on a general recording medium.

Next, the moving image recording process in step S317 in FIG. 3 will be described with reference to a flow chart in FIG. 5. FIG. 5 is a flow chart illustrating the moving image recording process executed on a general recording medium that is rewritable a plurality of times. In step S501, the system control unit 50 executes the same operation as in step S401 in FIG. 4. Next, the process proceeds to step S502. In step S502, the system control unit 50 determines whether the recording medium 120 has free space to determine any moving image recordable time. If the system control unit 50 determines that the recording medium 120 has moving image recordable time (YES in step S502), the process proceeds to step S503. If not (NO in step S502), the process proceeds to S515. Since steps S503 to S510 are the same as steps S402 to S409 in FIG. 4, respectively, the description thereof will be omitted.

In step S511, the system control unit 50 writes data management information in the recording medium 120. Next, the process proceeds to step S512. Since steps S512 to S514 are the same as steps S410 to S412 in FIG. 4, respectively, the description thereof will be omitted. In addition, since steps S515 to S521 are the same as steps S413 to S419 in FIG. 4, respectively, the description thereof will be omitted.

Figure 6:
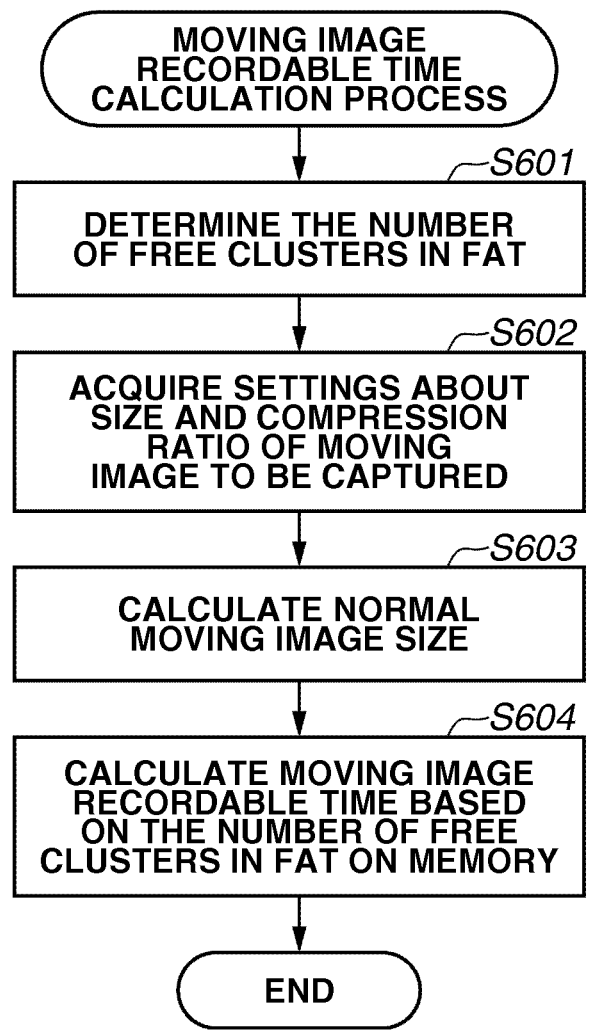
FIG. 6 is a flow chart illustrating a moving image recording time calculation process executed on the write-once recording medium.

Next, the moving image recordable time calculation process in step S412 in FIG. 4 will be described with reference to a flow chart in FIGS. 6 and 8. FIG. 6 is a flow chart illustrating the moving image recordable time calculation process. FIG. 8 schematically illustrates states of the FAT read onto the memory 30 from the FAT file system of the recording medium 120.

In step S601, the system control unit 50 determines the number of free clusters from the FAT on the memory 30. Next, the process proceeds to step S602. FIG. 8A illustrates the FAT file system of the recording medium 120. FIG. 8B illustrates a FAT 801, which is the FAT 203 read from the FAT file system of the recording medium 120 onto the memory 30. FIG. 8C illustrates contents of part of the FAT 801 on the memory 30 (shaded areas in FIGS. 8A and 8B). FIG. 8C illustrates contents of part of the FAT 801 obtained by reading the FAT 203 of the write-once recording medium 120 in which no data is recorded. In a FAT entry 802 of the FAT 801, FF represents a used cluster and 00 represents a free cluster. Thus, in step S601, the system control unit 50 determines the number of free clusters in the FAT 801.

In step S602, the system control unit 50 acquires various mode settings, such as the size and the compression ratio of a moving image to be captured, from the non-volatile memory 56. Next, the process proceeds to step S603. In step S603, based on the acquired mode, the system control unit 50 calculates a normal moving image size. Next, the process proceeds to step S604.

In step S604, the system control unit 50 calculates the moving image recordable time, based on the number of free clusters in the FAT on the memory 30. More specifically, assuming that one sector is A bytes, one cluster is B sectors, and the number of free clusters in the FAT on the memory 30 is X, (A·B·X) byte data can be cached in the FAT on the memory 30. In addition, assuming that the moving image bit rate is Y [bytes/S], the system control unit 50 can calculate the moving image recordable time by (A·B·X)/Y[S].

FIG. 8D illustrates a FAT 803 in which cluster numbers are written in free clusters in step S406 of the flow chart in FIG. 4. When the moving image recording process is stopped, as illustrated in FIG. 8D, EOF representing a file end is written in cluster number 10. The system control unit 50 writes information about the FAT 803 illustrated in FIG. 8D in the recording medium 120.

In this way, when the camera 100 according to the present exemplary embodiment records moving image data in the write-once recording medium 120 using the FAT file system, the camera 100 displays the moving image recordable time based on the number of free clusters in the FAT secured on the memory 30. Thus, the user can accurately grasp the moving image recordable time. In addition, after stopping the moving image recording process, the camera 100 according to the present exemplary embodiment writes the FAT on the memory 30 in the recording medium 120. Thus, processing load during recording of moving image data can be reduced. As a result, the camera 100 can record moving image data and calculate the moving image recordable time at high speed.

The present invention is not limited to the above exemplary embodiment. Various variations, modifications, and the like are possible within the scope of the present invention. For example, the camera 100 may read at least part of the FAT of the recording medium 120 onto the memory 30. In addition, the above exemplary embodiment is applicable to a camera capable of capturing a still image during recording of a moving image (movie snap means). When capturing a still image during recording of a moving image, the user uses the mode dial switch 60 to set a movie snap mode. Such type of camera determines whether or not the attached recording medium is a write-once recording medium. If a general recording medium 120 is attached to the camera, the camera enables the movie snap mode. However, if attached to a write-once recording medium 120, the camera disables the movie snap mode. In this way, since free clusters in the FAT secured in the memory 30 are not used for recording of still image data, the moving image recordable time calculated based on free clusters in the FAT reserved in the memory 30 can be secured.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-006297 filed Jan. 14, 2011, which is hereby incorporated by reference herein in its entirety.

What is claimed is:

1. A moving image recording apparatus, comprising:
   a reading unit configured to read a part of file allocation table (FAT) information from a recording medium whose files are managed by a FAT file system, and store the FAT information in a storage unit, wherein an amount of the FAT information storable to the storage unit is variable according to a condition of the moving image recording apparatus;
   a first time calculating unit configured to calculate moving image recordable time based on a number of free clusters of the recording medium;
   a second time calculating unit configured to calculate moving image recordable time based on the number of free clusters of the recording medium corresponding to the FAT information stored in the storage unit;
   a recording medium determination unit configured to determine whether a recording medium attached to an attachment unit is a write-once recording medium; and
   a display controlling unit configured to display the time calculated by the first time calculating unit if the recording medium determination unit determines that the recording medium is not a write-once recording medium, and display the times calculated by the first time calculating unit and the second time calculating unit if the recording medium determination unit determines that the recording medium is a write-once recording medium.

2. The moving image recording apparatus according to claim 1, further comprising:
   a moving image recording unit configured to record moving image data in the recording medium attached to the attachment unit;

an updating unit configured to update the FAT information read onto the storage unit, based on the recording medium on which recording is executed by the moving image recording unit; and a writing unit configured to write the FAT information updated by the updating unit in the recording medium when recording of the moving image data is completed.

3. The moving image recording apparatus according to claim 2, further comprising:

a cluster determination unit configured to determine whether a free cluster for recording the moving image remains in the recording medium by analyzing the updated FAT information, wherein, if no free cluster remains in the recording medium, the moving image recording unit ends recording of the moving image data.

4. The moving image recording apparatus according to claim 1, further comprising:

a time determination unit configured to determine whether the time calculated by the first calculation unit matches the time calculated by the second calculation unit, wherein, if the time determination unit determines the times do not match one another, the display controlling unit displays both of the time calculated by the first time calculating unit and the time calculated by the second time calculating unit, on the display unit.

5. The moving image recording apparatus according to claim 4, wherein the display controlling unit displays the time calculated by the first time calculating unit and the time calculated by the second time calculating unit in different forms.

6. The moving image recording apparatus according to claim 1, further comprising:

a still image shooting unit configured to capture a still image, wherein the still image shooting unit can receive user instructions and capture a still image while the moving image recording unit is recording moving image data, and wherein, if the recording medium determination unit determines that the recording medium is a write-once recording medium, even if the still image shooting unit receives user instructions to capture a still image, the still image shooting unit does not capture the still image while the moving image recording unit is recording moving image data.

7. A moving image recording method, comprising:

reading a part of file allocation table (FAT) information from a recording medium whose files are managed by a FAT file system, and store the FAT information in a storage unit, wherein an amount of the FAT information storable to the storage unit is variable according to a condition of a moving image recording apparatus;

calculating moving image recordable time based on a number of free clusters of the recording medium;

calculating moving image recordable time based on the number of free clusters of the recording medium corresponding to the FAT information stored in the storage unit;

determining whether a recording medium attached to an attachment unit is a write-once recording medium; and displaying the time calculated based on the number of free clusters of the recording medium if it is determined that the recording medium is not a write-once recording medium, and display the times calculated based on the number of free clusters of the recording medium and number of free clusters of the recording medium corresponding to the FAT information stored in the storage unit if it is determined that the recording medium is a write-once recording medium.

8. A non-transitory storage medium storing a program causing a computer to execute a moving image recording method comprising:

reading a part of file allocation table (FAT) information from a recording medium whose files are managed by a FAT file system, and store the FAT information in a storage unit, wherein an amount of the FAT information storable to the storage unit is variable according to a condition of a moving image recording apparatus;

calculating moving image recordable time based on a number of free clusters of the recording medium;

calculating moving image recordable time based on the number of free clusters of the recording medium corresponding to the FAT information stored in the storage unit;

determining whether a recording medium attached to an attachment unit is a write-once recording medium; and displaying the time calculated based on the number of free clusters of the recording medium if it is determined that the recording medium is not a write-once recording medium, and display the times calculated based on the number of free clusters of the recording medium and number of free clusters of the recording medium corresponding to the FAT information stored in the storage unit if it is determined that the recording medium is a write-once recording medium.

* * * * *